UNITED STATES PATENT OFFICE.

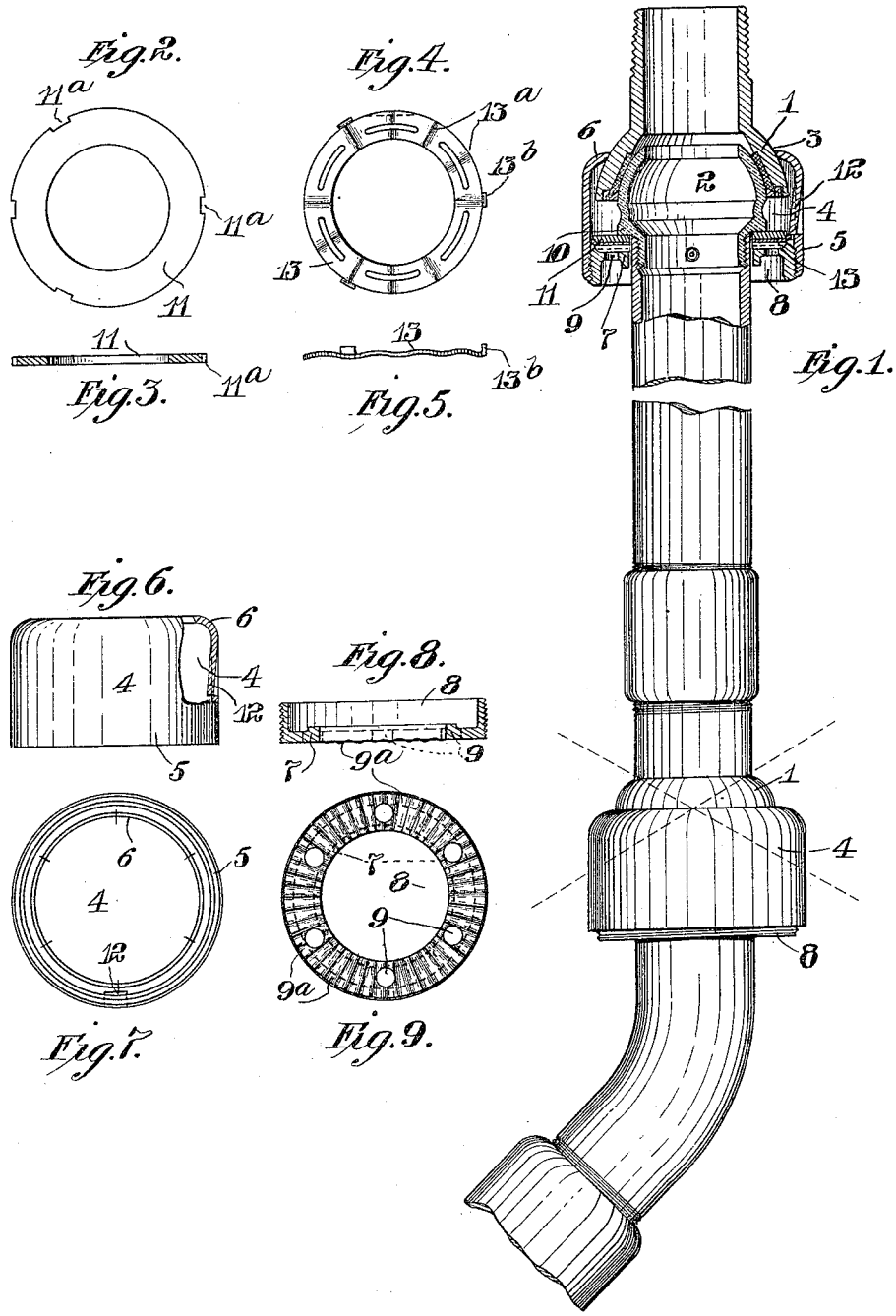

CHARLES FORTH, OF OTTAWA, ONTARIO, CANADA.

PIPE-JOINT.

1,140,508.   Specification of Letters Patent.   Patented May 25, 1915.

Application filed November 24, 1913. Serial No. 802,617.

*To all whom it may concern:*

Be it known that I, CHARLES FORTH, a citizen of the United States, residing at Ottawa, Canada, have invented certain new and useful Improvements in Pipe-Joints, of which the following is a specification, reference being had therein to the accompanying drawing.

This invention relates to flexible pipe joints, more particularly of the "ball and socket" type, the object of the invention being to provide for a freedom of movement of the parts in all directions while maintaining a fluid tight connection between them.

The invention is designed with particular reference to application to train pipe systems for air or steam, and has in view the production of an all-metal joint of simple and durable construction and adapted for use in place of the comparatively frail expensive and unreliable rubber hose terminals now so universally employed in railway train pipe systems.

The invention consists of various improved features of construction in pipe joints of the type mentioned, which improved features will be fully set forth in the specification and the novel parts specified in the claims.

In the accompanying drawings: Figure 1 is an elevation showing a section of piping provided with two joints embodying my invention, one of the joints being shown in section and the other in elevation. Figs. 2 and 3 are a plan view and a sectional view respectively of the bearing washer. Figs. 4 and 5 are a plan view and an edge view respectively of the spring washer. Figs. 6 and 7 are a side elevation and an edge view respectively of the surrounding connecting sleeve. Figs. 8 and 9 are a sectional view and a plan view respectively of the confining nut.

Referring to the drawings: My improved joint comprises a socket member 1 having a spherically formed socket in which is loosely seated so as to turn and rock universally therein, a ball member 2. The socket member is provided with an external bearing surface 3 curved from a center coincident with the center of the spherical socket, which bearing surface is engaged loosely by one end of a connecting device 4, the opposite end of which has operative engagement with the ball member as will be more fully described hereinafter. The connecting device consists of a sleeve 5 surrounding the two members, one end of the sleeve being formed with an inwardly extending annular flange 6 loosely engaging the bearing surface 3, while at its opposite end the sleeve is provided with an inwardly extending shoulder 7 in the form of a nut 8 screwed into the sleeve and provided with holes 9 for the engagement of a wrench for turning it. The ball member is provided with a peripheral ledge 10, and against this ledge is seated a bearing washer 11 formed in its edge with a series of notches $11^a$ any one of which is adapted to receive a tongue 12 extending inwardly from the sleeve 5, by means of which the washer may be interlocked with the sleeve so as to turn therewith.

13 represents a spring washer in the form of a flat ring of resilient material provided with radial corrugations $13^a$. This washer is formed with lugs $13^b$ adapted to enter the notches in the bearing washer 11 by which means the spring washer may be interlocked with the bearing washer and seated flatly against the same as shown in Fig. 1. The confining nut 8 before alluded to bears against the spring washer, and the face of the nut is corrugated or roughened as shown at $9^a$ to coöperate with the corrugations in the spring washer, so that when the nut is screwed up in the sleeve and caused to bear against the washer, it will become frictionally interlocked therewith and be prevented from accidentally unscrewing or becoming loosened.

As a result of the construction described it will be observed that the spring washer being placed under tension by the confining nut, will in reacting on the sleeve 5, tend to draw said sleeve longitudinally with reference to the ball member, and the sleeve by engaging the bearing surface 3 of the socket member will act to draw and hold said member in yielding engagement with the ball member, while permitting freedom of movement of said members relatively to each other in all directions. By reason of the fact that the bearing washer is interlocked with the surrounding sleeve, and that the spring washer is interlocked with the bearing washer, and further that the confining nut is interlocked with the spring washer, said parts are connected so as to form in effect a single structure which is movable circumferentially relatively to the ball member, and in relation to which the socket member may move in all directions. Further by reason of the fact that the bearing washer connected with the connecting sleeve, bears at its inner edge against the ledge 10 on the ball member, and is spring pressed thereagainst by the spring washer, the said connecting sleeve will be prevented from rocking, or lateral tipping movement relatively to the ball member, but will be permitted freedom of movement circumferentially.

The construction as a whole is simple in form and effective in operation in providing a fluid tight connection between the ball and socket members, while at the same time permitting of freedom of relative movement of the parts in all directions; and by reason of the fact that the spring washer acts to prevent the accidental loosening of the confining nut, the parts will be held and maintained in proper operative spring engagement, with no liability of the variation or change in the spring tension.

In the event of its being desired, in case of wear, to tighten up the connecting sleeve to cause the ball and socket members to maintain proper operative engagement, it will only be necessary to screw up the confining nut by the application thereto of a proper tool, with the result that the roughened surface or corrugations on the nut will be forced past the coöperating corrugations on the spring washer, and will take a new position and be yieldingly locked in the said position.

In the foregoing description and accompanying drawings I have disclosed my invention in the particular form and details which I prefer to adopt, and which in actual practice has been found to answer the objects to be obtained, but it will be understood that the details may be variously changed and modified without departing from the limits of my invention; and further it will be understood that the invention is not limited to any particular form or construction of the parts except in so far as such limitations are specified in the claims.

Having thus described my invention, what I claim is:

1. In a pipe joint the combination of a socket member formed with an external curved bearing surface, a ball member seated therein and rockable universally, a surrounding circumferentially movable connecting device formed to loosely engage said curved bearing surface and provided with an inwardly extending shoulder, and a flat spring washer between the shoulder and ball member and operatively interlocked with the connecting device to move circumferentially with the same.

2. In a pipe joint, the combination of a socket member formed with an external bearing surface, a ball member seated therein and rockable therein universally, a surrounding circumferentially movable sleeve formed to loosely engage the said bearing surface and provided with an inwardly extending flat shoulder, an annular flat washer detachably interlocked with said sleeve and movable circumferentially with the same and engaging the ball member, and a flat spring washer between the shoulder and annular washer, said spring washer being detachably interlocked with the annular washer so as to move circumferentially with the same and the sleeve.

3. In a pipe joint the combination of a socket member provided with an external curved bearing surface, a ball member seated in the socket member and rockable universally and provided with an annular ledge, a surrounding circumferentially movable sleeve engaging the curved bearing surface, an annular washer interlocked with the sleeve and engaging the ledge, a spring washer interlocked with the annular washer and provided with corrugations, and a confining nut screwed in the sleeve and formed with an inwardly extending shoulder roughened to engage the corrugations in the spring washer.

4. In a pipe joint the combination of a socket member provided with an external curved bearing surface, a ball member seated and rockable universally in the socket member, a surrounding circumferentially movable sleeve, a spring washer movable circumferentially with the sleeve and acting on the ball member, said washer having a roughened surface, and a confining nut screwed in the sleeve and provided with a roughened shoulder engaging the roughened surface of the spring washer.

5. In a pipe joint the combination of a socket member provided with an external curved bearing surface, a ball member seated in the socket member and rockable universally, a surrounding circumferentially movable connecting sleeve, a spring washer movable circumferentially with the sleeve and acting on the ball member, and a confining nut screwed in the sleeve and yieldingly interlocked with the washer.

In testimony whereof I have affixed my signature in presence of two witnesses.

CHARLES FORTH.

Witnesses:
A. GEORGE BLAIR,
D'ARCY SCOTT.